(12) United States Patent
Zhang

(10) Patent No.: US 8,532,381 B2
(45) Date of Patent: Sep. 10, 2013

(54) METHOD AND APPARATUS FOR IMPROVING THE STABILITY OF HISTOGRAM CORRELATION ALGORITHM

(75) Inventor: Buyue Zhang, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 259 days.

(21) Appl. No.: 12/901,185

(22) Filed: Oct. 8, 2010

(65) Prior Publication Data

US 2011/0123112 A1    May 26, 2011

Related U.S. Application Data

(60) Provisional application No. 61/262,953, filed on Nov. 20, 2009.

(51) Int. Cl.
*G06K 9/00*     (2006.01)

(52) U.S. Cl.
USPC .......................................................... 382/168

(58) Field of Classification Search
None
See application file for complete search history.

(56) References Cited

U.S. PATENT DOCUMENTS

| | | | |
|---|---|---|---|
| 2003/0052978 A1* | 3/2003 | Kehtarnavaz et al. | ..... 348/223.1 |
| 2006/0110032 A1* | 5/2006 | Toshihiro et al. | ............ 382/162 |
| 2010/0020193 A1 | 1/2010 | Zhang | |

* cited by examiner

*Primary Examiner* — Stephen R Koziol
*Assistant Examiner* — Delomia Gilliard
(74) *Attorney, Agent, or Firm* — Mirna Abyad; W. James Brady; Frederick J. Telecky, Jr.

(57) ABSTRACT

A method and apparatus for improving stability of histogram correlation based image and video processing algorithms. The method includes computing a histogram for target signal and reference signal for generating a target histogram and a reference histogram, performing low pass filtering of the input signal and the reference signal and producing smoothed histograms, and performing correlation on the smoothed histograms for improving stability of histogram correlation.

2 Claims, 4 Drawing Sheets

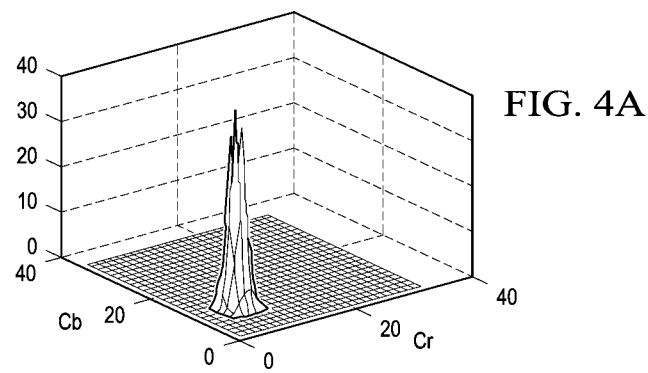
FIG. 4A
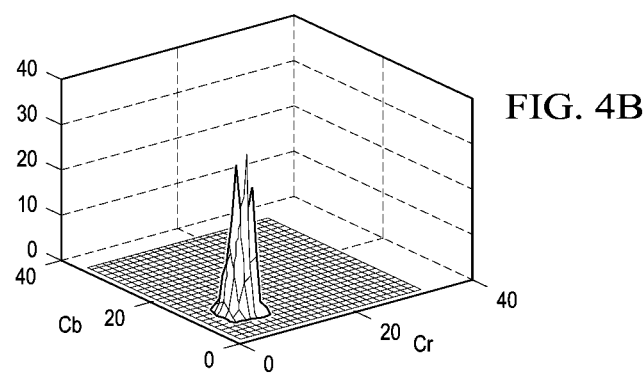
FIG. 4B
 
FIG. 4C        FIG. 4D

METHOD AND APPARATUS FOR IMPROVING THE STABILITY OF HISTOGRAM CORRELATION ALGORITHM

CROSS-REFERENCE TO RELATED APPLICATIONS

This application claims benefit of U.S. provisional patent application Ser. No. 61/262,953, filed Oct. 20, 2009, which is herein incorporated by reference.

BACKGROUND OF THE INVENTION

1. Field of the Invention

Embodiments of the present invention generally relate to a method and apparatus for improving stability of histogram correlation.

2. Description of the Related Art

A correlation based algorithm makes a decision by computing the correlation score between two signals/images. One of the challenges of a correlation algorithm is the stability of the correlation score. Small disturbance in the input signal/image can lead to fluctuation in the correlation score.

The histogram of the chromaticity of an image may contain peaks in close proximity, such peaks coupled with the discreteness nature of the histogram lead to unsmooth correlation score among adjacent video frames. Therefore, there exists a need for improving the stability of histogram correlation based image and video processing algorithms.

SUMMARY OF THE INVENTION

Embodiments of the present invention relate to a method and apparatus for improving stability of histogram correlation. The method includes computing a histogram for target signal and reference signal for generating a target histogram and a reference histogram, performing low pass filtering of the input signal and the reference signal and producing smoothed histograms, and performing correlation on the smoothed histograms for improving stability of histogram correlation.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIGS. 4 (a) and (b) are embodiments of Gaussian low pass filtered histogram of FIG. 1(c) and FIG. 1(d), respectively, FIGS. 4(c) and (d) are the new results of computing correlation score after low filtering;

DETAILED DESCRIPTION

Figure 1A:
FIGS. 1 (a) and (b) are embodiments depicting two consecutive shots of a brick wall.
FIG. 1(c) is the chromaticity histogram of (a)
FIG. 1(d) is the histogram of (b)
Figure 1B:
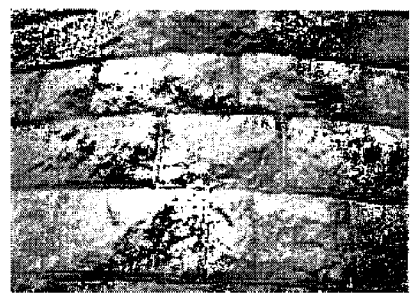
Figure 1C:
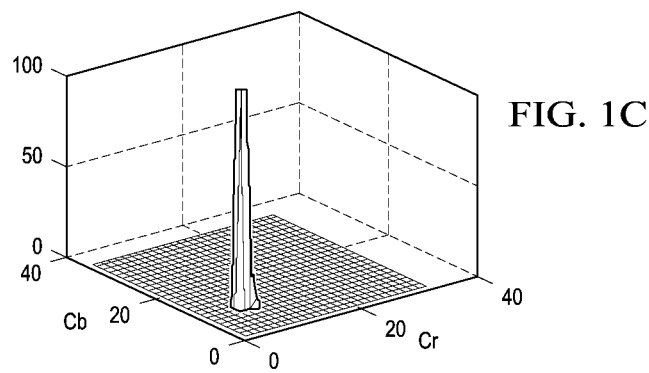
Figure 1D:
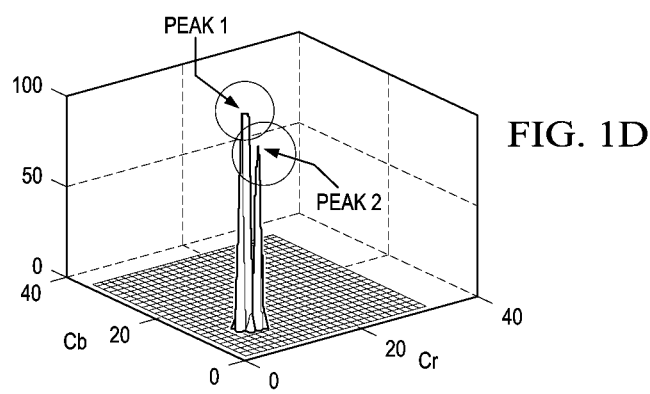

FIGS. 1 (a) and (b) are embodiments depicting two consecutive shots of a brick wall, FIG. 1(c) is the chromaticity histogram of (a), and FIG. 1(d) is the histogram of (b). In the histogram correlation based white balance algorithm, two consecutive shots of the same scene are taken. The histogram correlation score turned out to be very different for FIGS. 1 (a) and (b), and consequently the color temperature estimation and the white balance gains are very different.

The fluctuation in correlation score is due to the these factors: (1) the chromaticity histograms of these two images are narrowly concentrated in a small region, (2) the location of the peaks of the histograms are slightly different, and (3) both the histogram of the references and the histogram of the input image are discrete.

As a result of these properties, small disturbance of the histogram distribution can lead to a significant change of the correlation score, when the peak of the histogram of the input image overlaps with one of the peaks of the reference histogram, the correlation score will be very high, otherwise the score will be very low. The chromaticity histograms of the two images are shown in FIGS. 1 (c) and (d). Such instability has to be dealt with.

Figure 2:
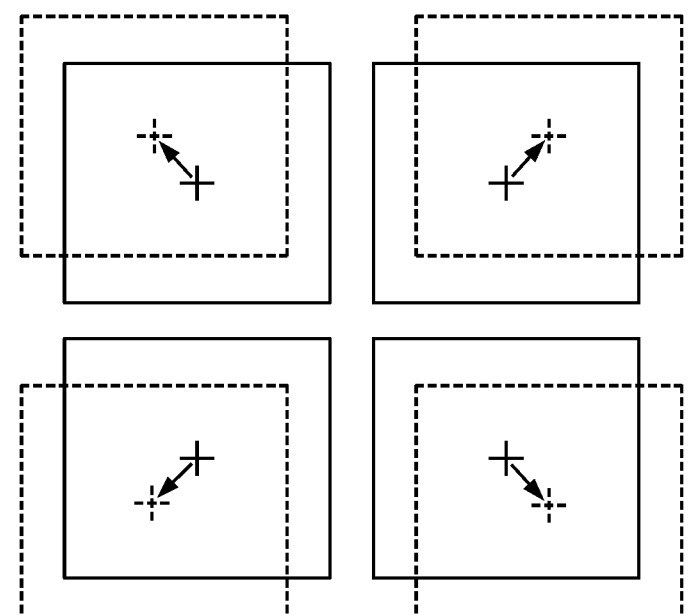
FIG. 2 is an embodiment of an Illustration of moving an input histogram towards upper left, upper right, lower left, and lower right direction.

Since the fluctuation of the correlation score is caused mainly by the discreteness of the histograms (or any input signals to a correlation algorithm), and it is usually worsened by the very narrowly concentrated histograms. Thus, it may be beneficial to "move around" the input signal in a small neighborhood and correlate it with the references multiple times. FIG. 2 is an embodiment of an Illustration of moving an input histogram towards upper left, upper right, lower left, and lower right direction.

Then, one may combine the correlation scores to get the final score, as shown in Eqn (1).

$$Corr_{Final} = \sum_k w_k \cdot CORR(H(i-n_k, j-m_k), G(i, j)) \quad (1)$$

This is equivalent to detecting a peak correlation in a neighborhood of the input signal, instead of just at one spot. This way the correlation score is more robust to small disturbance in the input histograms. In Eqn (1), CORR(H, G) is the operation of computing correlation between H and G. H is the target histogram/signal, G is the reference histogram/signal. $w_k$ is the weight applied to the k-th correlation. $n_k$ and $m_k$ are the amount of offset in shifting H.

Such an algorithm may be implemented by applying low pass filtering to the input histogram. The Gaussian low pass filter is given in Eqn (2)

$$Gauss(m, n) = C \cdot e^{-\frac{m^2+n^2}{2\sigma^2}} \quad (2)$$

Where $$C = \frac{1}{\sum_m \sum_n e^{-\frac{m^2+n^2}{2\sigma^2}}} \quad (3)$$

We chose σ=1.0 and the kernel size of the Gaussian filter to be 5×5.

Figure 3:
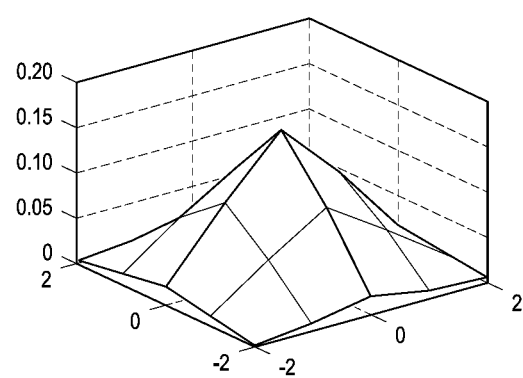
FIG. 3 is an embodiment of Gaussian low pass filter.

FIG. 3 is an embodiment of Gaussian low pass filter. To improve the accuracy of the correlation, one may apply the Gaussian low pass filter to the reference histograms before computing the correlation. Now the correlation score is computed as follows:

Step 1: $\overline{H}$=Gauss*$H$ (4), where H is the input histogram/signal

Step 2: $\overline{G}$=Gauss*$G$ (5), where G is the reference histogram/signal

Step 3: $Corr_{Final}$=CORR($\overline{H},\overline{G}$), (6)

where the correlation operation CORR(H,G) is defined below:

$$CORR(H, G) = \frac{\sum_m \sum_n H(m, n) \cdot G(m, n)}{StdDev(H) \cdot StdDev(G)},$$ (7)

and $$StdDev(X) = \sqrt{\frac{1}{M \cdot N} \sum_{n=1}^{N} \sum_{m=1}^{M} X(m, n)^2}$$ (8)

The low pass filtering of the histograms make the histograms much more robust to small disturbance, and consequently leading to much more stable correlation scores. The filtered histograms and the resulting images are shown in FIG. 4. FIGS. 4(a) and (b) are embodiments of Gaussian low pass filtered histogram of FIG. 1(c) and FIG. 1(d), respectively, FIGS. 4(c) and (d) are the new results of computing correlation score after low passing.

The technique described in this disclosure may be applied to improve the robustness and stability of any correlation algorithms in general, where the signals are low pass filtered to reduce the influence of noise. The selection of the parameter of the low pass filter is very important. In terms of a Gaussian filter, the kernel size should be at least 5 times of the standard deviation of the Gaussian filter, and the standard deviation should be small to avoid excessive expansion of the signal, as well as restraining computation to minimal.

Figure 5:
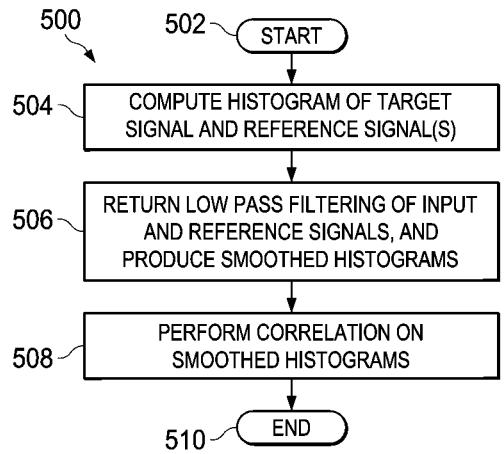
FIG. 5 is a flow diagram depicting an embodiment of a method for improving stability of histogram correlation.

FIG. 5 is a flow diagram depicting an embodiment of a method 500 for improving stability of histogram correlation. The method 500 starts at step 502 and proceeds to step 504. At step 504, the method 500 computes a histogram for target signal and reference signal. At step 506, the method 500 performs low pass filtering of input and reference signal and produces smoothed histograms. At step 508, the method 500 performs correlation on the smoothed histograms. The method 500 ends at step 510.

Figure 6:
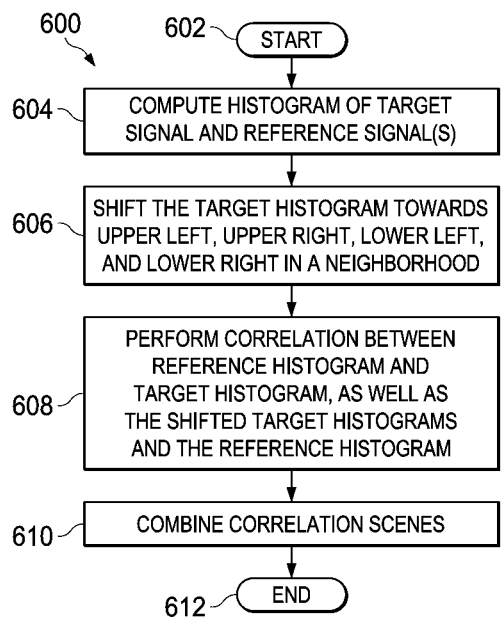
FIG. 6 is a flow diagram depicting another embodiment of a method for improving stability of histogram correlation

FIG. 6 is a flow diagram depicting another embodiment of a method 600 for improving stability of histogram correlation. The method 600 starts at step 602 and proceeds to step 604. At step 604, the method 600 computes a histogram for target signal and reference signal. At step 606, the method 600 shifts the target histogram towards upper left, upper right, lower left and lower right in a neighborhood. At step 608, the method 600 performs correlation between reference histogram and target histogram and between shifted target histogram and the referenced histogram. At step 610, the method 600 combines correlation scores. The method 600 ends at step 612.

While the foregoing is directed to embodiments of the present invention, other and further embodiments of the invention may be devised without departing from the basic scope thereof, and the scope thereof is determined by the claims that follow.

What is claimed is:

1. A method of a processor for improving stability of histogram correlation, comprising:
   computing a histogram for target signal and reference signal for generating a target histogram and a reference histogram;
   shifting the target histogram towards upper left, upper right, lower left and lower right in a neighborhood to generate a shifted target histogram;
   performing correlation between the reference histogram and the target histogram and between the shifted target histogram and the referenced histogram ; and
   combining related correlation scores for improving stability of histogram correlation.

2. A non-transitory computer readable medium including executable instructions, when executed perform a method for improving stability of histogram correlation, the method comprising:
   computing a histogram for target signal and reference signal for generating a target histogram and a reference histogram;
   shifting the target histogram towards upper left, upper right, lower left and lower right in a neighborhood to generate a shifted target histogram;
   performing correlation between the reference histogram and the target histogram and between the shifted target histogram and the referenced histogram; and
   combining related correlation scores for improving stability of histogram correlation.

* * * * *